(12) United States Patent
Wyss

(10) Patent No.: US 10,540,966 B2
(45) Date of Patent: Jan. 21, 2020

(54) SYSTEM AND METHOD FOR PARAMETERIZATION OF SPEECH RECOGNITION GRAMMAR SPECIFICATION (SRGS) GRAMMARS

(71) Applicant: GENESYS TELECOMMUNICATIONS LABORATORIES, INC., Daly City, CA (US)

(72) Inventor: Felix Immanuel Wyss, Zionsville, IN (US)

( * ) Notice: Subject to any disclaimer, the term of this patent is extended or adjusted under 35 U.S.C. 154(b) by 0 days.

(21) Appl. No.: 15/802,269

(22) Filed: Nov. 2, 2017

(65) Prior Publication Data

US 2018/0122370 A1  May 3, 2018

Related U.S. Application Data

(60) Provisional application No. 62/416,194, filed on Nov. 2, 2016.

(51) Int. Cl.

| | |
|---|---|
| *G10L 15/19* | (2013.01) |
| *G10L 15/193* | (2013.01) |
| *G10L 15/06* | (2013.01) |
| *H04M 3/493* | (2006.01) |

(52) U.S. Cl.
CPC .......... *G10L 15/193* (2013.01); *G10L 15/063* (2013.01); *H04M 3/4938* (2013.01); *G10L 2015/0631* (2013.01)

(58) Field of Classification Search
USPC ................. 704/246, 247, 251, 252, 270
See application file for complete search history.

(56) References Cited

U.S. PATENT DOCUMENTS 5,642,519 A * 6/1997 Martin ................ G10L 15/1822
                                                          704/255
5,991,722 A * 11/1999 Thompson .............. G10L 13/00
                                                          704/258

(Continued)

OTHER PUBLICATIONS

Hunt, Andrew, et al.; Speech Recognition Grammar Specification Version 1.0, W3C Recommendation, retrieved from <https://www.w3.org/TR/speech-grammar/>, Section 4.6, Mar. 16, 2004, 3 pages.

(Continued)

*Primary Examiner* — Leonard Saint Cyr

(57) ABSTRACT

A method includes: loading, by a processor, a grammar specification defining at least one parameterizable grammar including a plurality of rules; setting, by the processor, an initial state of a grammar processor as a current state, the current state including parameters supplied to the rules; selecting, by the processor, a rule of the plurality of rules matching the parameters of the current state of the grammar processor; applying, by the processor, the selected rule to the audio and updating the current state; determining, by the processor, whether termination conditions have been met; in response to determining the termination conditions are not met, selecting, by the processor, from the plurality of rules in accordance with parameters of the updated state; and in response to determining the termination conditions are met, outputting, by the processor, a recognizer result of the current state.

19 Claims, 9 Drawing Sheets

(56) References Cited

U.S. PATENT DOCUMENTS

| | | | | |
|---|---|---|---|---|
| 6,374,226 | B1* | 4/2002 | Hunt | G10L 15/26 704/255 |
| 6,434,529 | B1* | 8/2002 | Walker | G10L 15/1822 704/275 |
| 6,499,013 | B1 | 12/2002 | Weber | |
| 8,209,184 | B1* | 6/2012 | Dragosh | G10L 15/30 704/270.1 |
| 8,392,193 | B2* | 3/2013 | Schultz | G10L 15/10 704/231 |
| 8,620,652 | B2* | 12/2013 | Chambers | G10L 15/22 704/231 |
| 2005/0096911 | A1* | 5/2005 | Schmid | G10L 13/04 704/270.1 |
| 2005/0131704 | A1* | 6/2005 | Dragosh | G10L 15/30 704/270.1 |
| 2005/0267754 | A1* | 12/2005 | Schultz | G10L 15/10 704/252 |
| 2006/0212515 | A1* | 9/2006 | Shienbrood | 709/203 |
| 2007/0276651 | A1* | 11/2007 | Bliss | G10L 15/30 704/9 |
| 2008/0235022 | A1 | 9/2008 | Bergl et al. | |
| 2008/0288259 | A1* | 11/2008 | Chambers | G10L 15/22 704/275 |
| 2009/0106028 | A1 | 4/2009 | Dhanakshirur et al. | |
| 2012/0259623 | A1* | 10/2012 | Dragosh | G10L 15/30 704/201 |
| 2016/0210968 | A1 | 7/2016 | Ouakil et al. | |
| 2017/0200450 | A1* | 7/2017 | Dragosh | G10L 15/30 |

OTHER PUBLICATIONS

International Search Report and Written Opinion for Application No. PCT/US2017/059797, dated Feb. 20, 2018, 12 pages.

McGlashan, Scott, et al., Voice Extensible Markup Language (Voice XML) Version 2.0, W3C Recommendation, http://www.w3.org/TR/2004/REC-voicexml20-20040316/, dated Mar. 16, 2004, 148 pages.

* cited by examiner

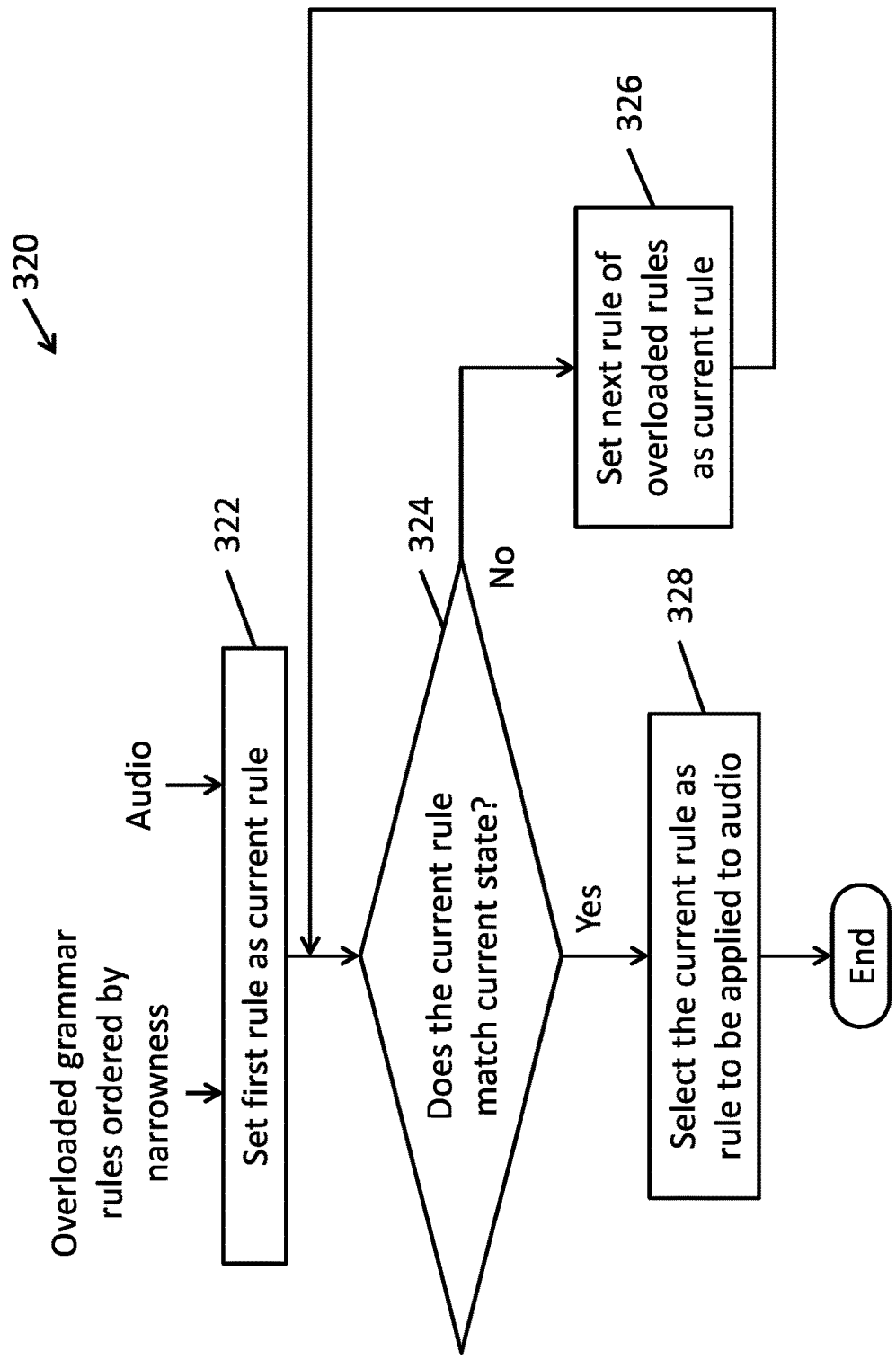

SYSTEM AND METHOD FOR PARAMETERIZATION OF SPEECH RECOGNITION GRAMMAR SPECIFICATION (SRGS) GRAMMARS

CROSS-REFERENCE TO RELATED APPLICATION(S)

This application claims the benefit of U.S. Provisional Patent Application No. 62/416,194, filed in the United States Patent and Trademark Office on Nov. 2, 2016, the entire disclosure of which is incorporated by reference herein.

FIELD

Aspects of embodiments of the present invention relate to the field of systems and methods for defining speech recognition grammars, including speech recognition systems capable of being configured to recognize speech based on patterns specified in a configuration setting (e.g., a configuration file).

BACKGROUND

Voice-controlled systems or voice controlled user interfaces, such as interactive voice response (IVR) and interactive media response (IMR) systems of contact centers, typically include speech recognition systems for converting audio signals containing speech into machine readable messages. In other words, the speech recognition systems may be used to parse user speech into commands or other user input, based on the semantics of the words contained in the speech.

Speech recognition systems also appear in other contexts, such as voice controlled user interfaces for intelligent personal assistants (such as Apple® Siri®, Amazon® Alexa®, and Google® Now), navigation systems, and televisions.

These voice-controlled user interfaces may often set constraints on the type of input based on the context. For example, when a voice-controlled user interface expects the user to supply a telephone number in the United States, the user interface may expect the user to provide ten digits (e.g., "two one two eight six seven five three oh nine"). These constraints or rules specifying expected speech recognition inputs (including DTMF inputs) may be referred to as grammars.

Voice extensible markup language (VoiceXML) is a digital document standard for specifying interactive media and voice dialogs between humans and computers. The Speech Recognition Grammar Specification (SRGS) Version 1.0 is a standard published by the World Wide Web Consortium (W3C) that defines a syntax for representing grammars for use in speech recognition, thereby allowing developers to specify the words and/or structure of a user input that the speech recognizer should expect to receive.

The VoiceXML document may specify a script for an interaction between an interactive voice response (IVR) or interactive media response (IMR) system 122. For example, the VoiceXML may specify a greeting that is first played to a caller when the caller is first connected to the IMR 122. The greeting may include a request for the user to provide identifying information, such as a customer account number. VoiceXML script may specify that the IMR 122 is to wait for the caller to provide the account number, where the account number is expected to meet particular conditions (e.g., a particular number of digits, such as a 16 digit account number or one digit, three alphabetic characters, and three more digits). The VoiceXML script may refer to an "account number" identifier, which identifies a corresponding "account number" grammar that is defined in a grammar document. The grammar document may be specified using, for example, SRGS, and defines the particular constraints of one or more named grammars. Accordingly, in this example, the grammar document may define an "account number" grammar and the constraints on this account number (e.g., 16 numeric digits or three alphabetic characters, and three more digits).

Once the speech recognition system determines the most likely input (e.g., utterance) it heard, the speech recognizer system extracts the semantic meaning from that input and returns that semantic meaning to the VoiceXML interpreter (so that the VoiceXML interpreter can take an action in response to the user input). This semantic interpretation is specified via the Semantic Interpretation for Speech Recognition (SISR) standard. SISR is used inside SRGS to specify the semantic results associated with the grammars, e.g., the set of ECMAScript (or JavaScript) assignments that create the semantic structure returned by the speech recognizer.

The current VoiceXML standard defines parameters for configuring grammars based on built-in digits and Boolean values. See, for example, McGlashan, Scott, et al., "Voice Extensible Markup Language (VoiceXML) Version 2.0", W3C Recommendation 16 Mar. 2004, Appendix P, which defines "Builtin Grammar Types." For example, digits may be used with "minlength" and "maxlength" parameters to specify a range of number of digits to expect. As another example, Boolean values may be parameterized to specify, in a dual-tone multi-frequency (DTMF) signaling system (or "touch tones") in which keypress corresponds to "yes" and which keypress correspond to "no."

However, the set of parameters for configuring these grammars is limited. For example, the VoiceXML standard merely provides the "length" in addition to the aforementioned "minlength" and "maxlength" parameters for specifying a number of digits, and the aforementioned parameters for specifying "yes" and "no" answers in Boolean DTMF grammars.

SUMMARY

Aspects of embodiments of the present invention are directed to systems and methods for parameterization of custom grammars in speech recognition engines. In more detail, aspects of embodiments of the present invention are directed to a speech recognizer or speech recognition system that is configured to receive parameterized grammars specified in configuration settings or a configuration file, and to recognize speech based on the parameterized grammars specified in the configuration settings. These parameterized grammars extend beyond the parameterized grammars that are available as part of the VoiceXML standard, and allow system administrators (e.g., administrators of a contact center interactive voice response or interactive media response system) to specify custom grammars using a modified grammar syntax (e.g., a modified version of SRGS), where these custom grammars can be parameterized in accordance with their particular business needs.

According to one embodiment of the present invention, a method for automatically recognizing speech matching grammars in audio includes: loading, by a processor, a grammar specification defining at least one parameterizable grammar, the at least one parameterizable grammar including a plurality of rules; setting, by the processor, an initial state of a grammar processor as a current state, the current state including parameters supplied to the rules; selecting, by the processor, a rule of the plurality of rules matching the parameters of the current state of the grammar processor; applying, by the processor, the selected rule to the audio and updating the current state; determining, by the processor, whether termination conditions have been met; in response to determining the termination conditions are not met, selecting, by the processor, from the plurality of rules in accordance with parameters of the updated state; and in response to determining the termination conditions are met, outputting, by the processor, a recognizer result of the current state.

Each of the rules may include a corresponding matching condition, the matching conditions having different levels of narrowness, the rules being ordered in accordance with corresponding levels of narrowness.

The selecting the rule from the plurality of rules may include: selecting a narrowest rule of the rules as a current rule; and iteratively: determining if the matching condition of the current rule is met; in response to determining that the matching condition is met, applying the current rule; and in response to determining that matching condition is not met, setting a next rule of the rules, in order of narrowness, as the current rule.

The matching condition may include a Boolean expression.

The Boolean expression may include an inequality condition.

The grammar may be a dual-tone multi-frequency grammar.

The grammar may be a voice grammar.

According to one embodiment of the present invention, a system includes: a processor; and memory having instructions stored thereon that, when executed by the processor, cause the processor to automatically recognize speech matching grammars in audio by: loading a grammar specification defining at least one parameterizable grammar, the at least one parameterizable grammar including a plurality of rules; setting an initial state of a grammar processor as a current state, the current state including parameters supplied to the rules; selecting a rule of the plurality of rules matching the parameters of the current state of the grammar processor; applying the selected rule to the audio and updating the current state; determining whether termination conditions have been met; in response to determining the termination conditions are not met, selecting from the plurality of rules in accordance with parameters of the updated state; and in response to determining the termination conditions are met, outputting a recognizer result of the current state.

Each of the rules may include a corresponding matching condition, the matching conditions having different levels of narrowness, the rules being ordered in accordance with corresponding levels of narrowness.

The memory may further stores instructions that, when executed by the processor, cause the processor to select a rule from the plurality of rules by: selecting a narrowest rule of the rules as a current rule; and iteratively: determining if the matching condition of the current rule is met; in response to determining that the matching condition is met, applying the current rule; and in response to determining that matching condition is not met, setting a next rule of the rules, in order of narrowness, as the current rule.

The matching condition may include a Boolean expression.

The Boolean expression may include an inequality condition.

The grammar may be a dual-tone multi-frequency grammar.

The grammar may be a voice grammar.

According to one embodiment of the present invention, a system for automatically recognizing speech matching grammars in audio includes: means for loading a grammar specification defining at least one parameterizable grammar, the at least one parameterizable grammar including a plurality of rules; means for setting an initial state of a grammar processor as a current state, the current state including parameters supplied to the rules; means for selecting a rule of the plurality of rules matching the parameters of the current state of the grammar processor; means for applying the selected rule to the audio and updating the current state; means for determining whether termination conditions have been met; means for selecting from the plurality of rules in accordance with parameters of the updated state, in response to determining the termination conditions are not met; and means for outputting a recognizer result of the current state in response to determining the termination conditions are met.

Each of the rules may include a corresponding matching condition, the matching conditions having different levels of narrowness, the rules being ordered in accordance with corresponding levels of narrowness.

The means for selecting a rule from the plurality of rules may include: means for selecting a narrowest rule of the rules as a current rule; and means for, iteratively: determining if the matching condition of the current rule is met; in response to determining that the matching condition is met, applying the current rule; and in response to determining that matching condition is not met, setting a next rule of the rules, in order of narrowness, as the current rule.

The matching condition may include a Boolean expression.

The Boolean expression may include an inequality condition.

BRIEF DESCRIPTION OF THE DRAWINGS

The accompanying drawings, together with the specification, illustrate exemplary embodiments of the present invention, and, together with the description, serve to explain the principles of the present invention.

FIG. 4B is a flowchart depicting a method for identifying a matching overloaded rule through pattern matching according to one embodiment of the present invention.

DETAILED DESCRIPTION

Aspects of embodiments of the present invention are directed to a speech recognition system or speech recognizer that is configured using a configuration file that defines one or more parameterizable grammars. These parameterizable grammars may be used in scripts such as VoiceXML scripts that control the operation of an interactive voice response (IVR) or interactive media response (IMR) system for interacting with callers. In particular, the scripts may include parameters that specify constraints on the grammars.

While the VoiceXML standard allows parameterization of the built-in "digit" grammars based on minlength, maxlength, or fixed length, and parameterization of the built-in Boolean grammar for DTMF responses to yes or no questions (e.g., specifying a particular key or touch tone for a "yes" response and a particular key or touch tone for a "no" response), the VoiceXML standard does not provide the passing of arbitrary parameters into the grammar to control the matching of audio to particular grammars or semantic tag evaluation.

One approach would be to use the semantic tags to specify the constraints. However, this would require evaluation of Semantic Interpretation for Speech Recognition (SISR) code during the recognizer search phase (e.g., while the recognizer is attempting to search for a matching grammar). However, the SISR code is generally implemented in ECMAScript (e.g., JavaScript), which means that executing the code may have unpredictable and potentially significant cost (e.g., may be computationally intensive or may never return), and there are risks (e.g., security risks) involved in running a JavaScript engine in the speech recognition system.

Figure 2:
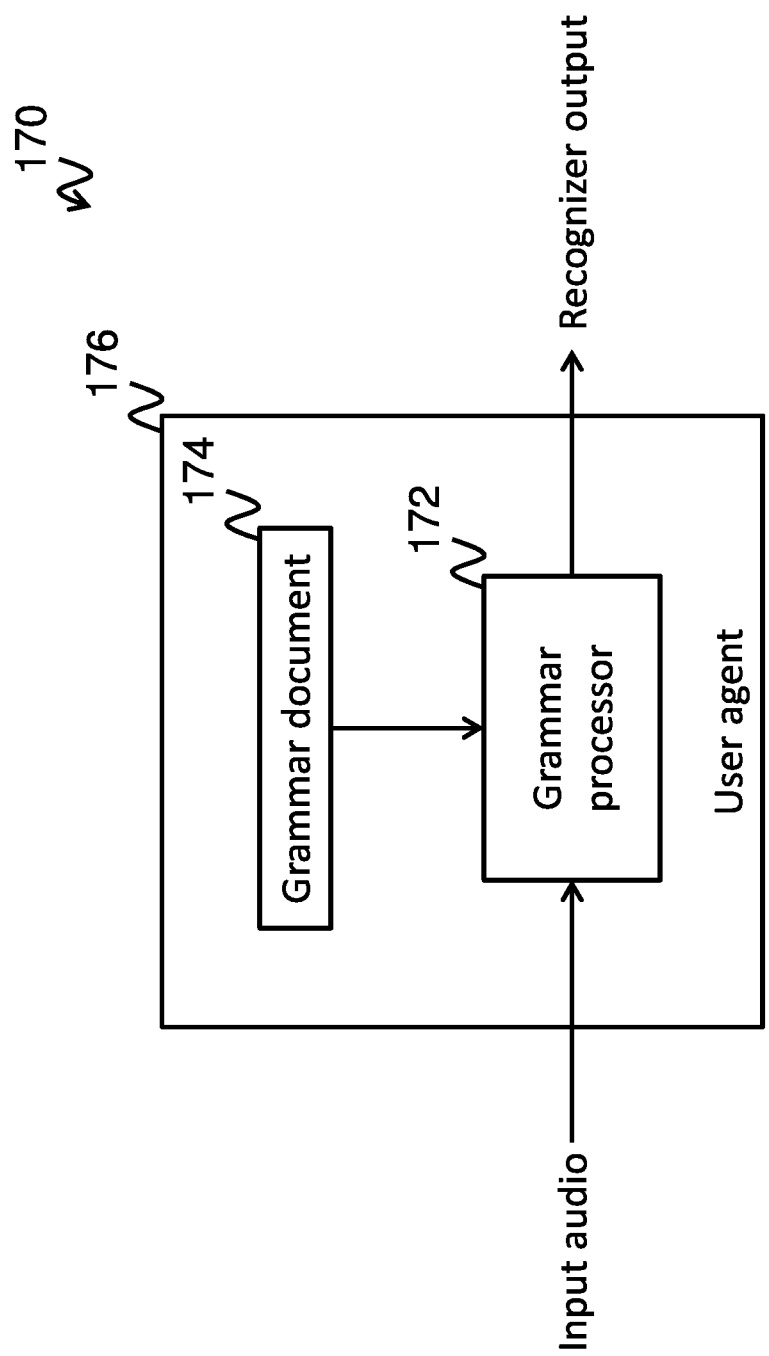
FIG. 2 is a schematic diagram depicting the configuration of a grammar processor and a user agent.

The term grammar processor may be used herein to refer to an entity, such as a software module, that accepts as input grammars as described in this specification. The term user agent may be used herein to refer to a grammar processor that accepts user input and matches that input against a grammar to produce a recognition result that represents the detected input. As such, a speech recognizer according to embodiments of the present invention may include a grammar processor and a user agent. FIG. 2 is a schematic diagram depicting the configuration of a grammar processor 172 using a grammar document 174 (e.g., an SRGS document) to create a user agent 176, where the user agent 176 takes input audio and generates recognizer output, the recognizer output corresponding to matching instances of user input found in the input audio in accordance with the grammars defined in the grammar document.

As such, aspects of embodiments of the present invention are directed to systems and methods for configuring a speech recognizer (e.g., configuring a grammar processor of a speech recognizer) with parameterizable grammars (e.g., parameterizable grammars in the grammar document 174). In some embodiments of the present invention, the parameters are implemented using syntactic substitution, and some embodiments of the present invention, implement runtime search constraints using a pattern matching technique similar to the technique used in the Prolog programming language.

In some embodiments, the parameterized grammars are implemented in a modified grammar processor. This allows parameterized control of grammars using only the execution of an SRGS grammar by a grammar processor and user agent, without resorting to the use of SISR code, which would require the additional overhead and risks associated with using an ECMAScript or JavaScript engine.

As such, embodiments of the present invention improve the operation of a speech recognizer. In particular, embodiments of the present invention enable the implementation of richer and more complex grammars for recognizing user input, through the extension of a grammar specification (e.g., SRGS) with parameterized grammars. This, in turn, allows these richer grammars to be implemented and detected by a grammar processor using the grammar specification, without using a separate scripting engine (e.g., an ECMAScript or JavaScript engine) for interpreting a script (e.g., SISR code) to implement those richer grammars. The avoidance of the use of the separate scripting engine improves runtime performance and reduces the latency of processing, thereby allowing speech recognition systems according to embodiments of the present invention to respond to customer requests more quickly and in a more predictable amount of time than would be possible if the grammar rules were implemented using SISR code.

Contact Center Overview

Figure 1:
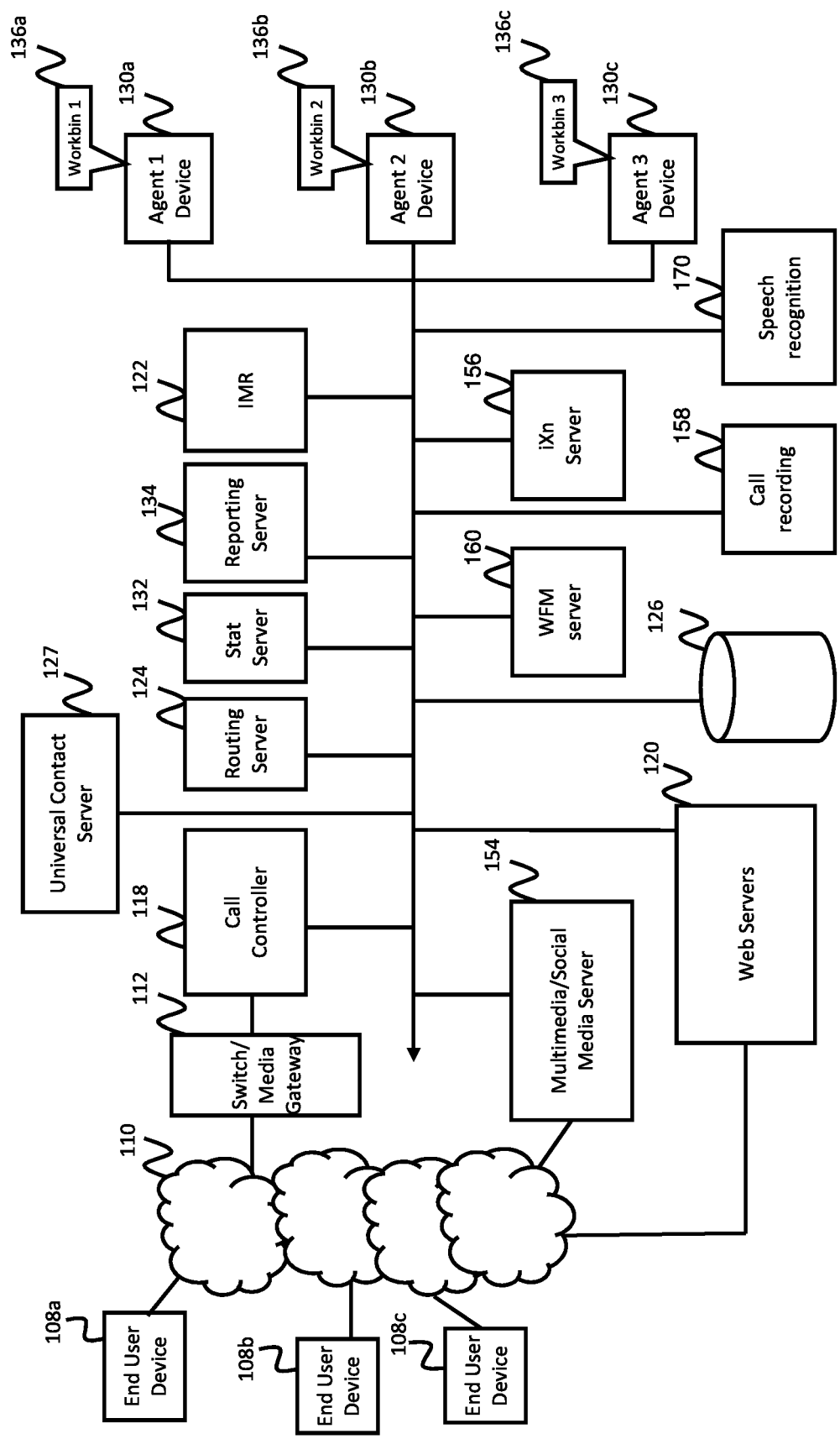
FIG. 1 is a schematic block diagram of a system for supporting a contact center in providing contact center services according to one exemplary embodiment of the invention.

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The contact center system may also include a call recording server 158 configured to record interactions, including voice calls, text chats, emails, and the like. The recorded interactions may be stored in the mass storage device 126, in addition to other types of data. In some embodiments, the mass storage device includes multiple storage devices (e.g., multiple hard drives or solid state drives). In some embodiments of the present invention, the mass storage device 126 is abstracted as a data storage service, which may be a cloud based service such as Amazon Simple Storage Service (S3) or Google Cloud Storage.

The contact center system may also include a workforce management server 160, which is configured to manage the agents of a contact center, including setting the work schedules of the agents of the contact center in accordance with predicted demand (e.g., predicted numbers of incoming and outgoing interactions with the contact center across the different media types), in accordance with agent vacation plans, break times, and the like. The schedules generated by the workforce management server may also account for time spent by agents and supervisors in meetings, group or individual training sessions, coaching sessions, and the like. Taking into account the various demands on an agent's time and a supervisor's time during the work day can be used to ensure that there are sufficient agents available to handle the interactions workload.

The contact center system may further include a speech recognition server 170 configured to provide speech recognition of speech or voice based interactions in the contact center. For example, the speech recognition server 170 may provide speech recognition services to the interactive media response (IMR) server 122 in order to recognize customer input provided via speech and to convert the speech into recognized words or phrases (e.g., parsing and tokenizing the customer speech). In some circumstances, the speech recognition server 170 may also provide general speech-to-text conversion. Furthermore, the speech recognition server 170 may also be configured to recognize dual-tone multi-frequency (DTMF) tones (or "touch tones") that are input by a caller through a telephone keypad. In some embodiments, the speech recognition server 170 is integrated into the IMR server 122 (e.g., provided as a software module of the IMR server 122) in order to parse and process the customer speech provided to the IMR server 122. In other embodiments, the speech recognition server 170 is provided by a separate service (e.g., as a separate microservice).

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Parameterization of Grammars in General

Generally, referencing parameters may be passed to a grammar in the URI reference or in an attribute map as name/value pairs. These parameters may be referenced in a Speech Recognition Grammar Specification (SRGS) file using the syntax {@paramname}.

For example:

```
public $root =
{
    test {out='{@foo}'}
};
```

When referencing this grammar in a URI reference, such as:
mygram.gram?foo=This %20 was %20 a %20 a %20 value
the semantic tag returned when that token is recognized will be:
out='This is a value'

These parameter references can be used in semantic tags, weights, and as constraint parameter values for rules (as discussed in more detail below). However, the SRGR does not allow the parameters to be used to modify the tokens in the audio to be recognized.

Rule Constraints, in General

To implement the parameterized constraints specified by the VoiceXML standard, such as the length, minlength, and maxlength constraints of the built-in digits grammar, it is not sufficient to add a repetition quantifier to the grammar.

More concretely, a grammar for matching a sequence of four digits (e.g., in the case of a personal identification number or PIN), cannot simply be represented as the grammar:
$digit<4>
where "$digit" represents the class of single digits and "<4>" indicates the number of times a digit is to be repeated.

This is because the VoiceXML standard specifies that the word "double" may be used to specify the repetition of the same digit. For example, the number 2551 can be spoken by a user as four separate digits "two five five one", which would be recognized by the above grammar, but could also be spoken as "two double five one", which would not be recognized by the above grammar. A separate class called "$double" may be used to represent doubled digits, where, for example, detecting the words "double two" results in producing "22" as the output.

To take into account the option of "doubles," an alternative grammar could be defined:
($digit|$double)<4>
where the "|" symbol indicates an alternative, in other words, matching either a single digit or a double. However this could produce strings of four to eight digits, because the "$double" would be counted as a single repetition of the 4 repetitions. As a concrete example, input speech of "two double five one six" would be matched as a sequence of length 4:
[$digit, $double, $digit, $digit]
but the output of this would be "25516" which has a length of five, rather than the expected length of a four digit pin code.

To implement the dual-tone multi-frequency (DTMF) boolean grammar parameterization, token parameterization needs to be supported. However, supporting parametric tokes for voice grammars becomes complex and prevents ahead-of-time compilation of the grammars, and implementing parametric tokens just for supporting DTMF can be a lot of work for little gain.

Embodiments of the present invention provide systems and methods for implementing parameterization of SRGS grammars, such as the above discussed constraints, in a speech recognizer.

Syntactic Substitution in SRGS Grammars

Some aspects of embodiments of the present invention are directed to systems and methods for syntactic substitution in speech recognition grammar specification (SRGS) grammars. These systems and methods may be implemented within a speech recognizer, such a speech recognizer software running in a speech recognition server 170 or in an interactive media response server 122, although embodiments of the present invention are not limited thereto.

In one aspect of embodiments of the present invention, the speech recognizer software includes a grammar processor that is configured to execute SRGS grammars that can be configured based on parameters (e.g., parameters that supplied externally by the VoiceXML script). In other words, a grammar processor according to embodiments of the present invention is configured to accept parameterized grammars (e.g., grammars that are configured by one or more arguments provided by a grammar). The parameterized grammar itself may also be provided from an external source (e.g., a configuration file or other configuration data).

Figure 3:
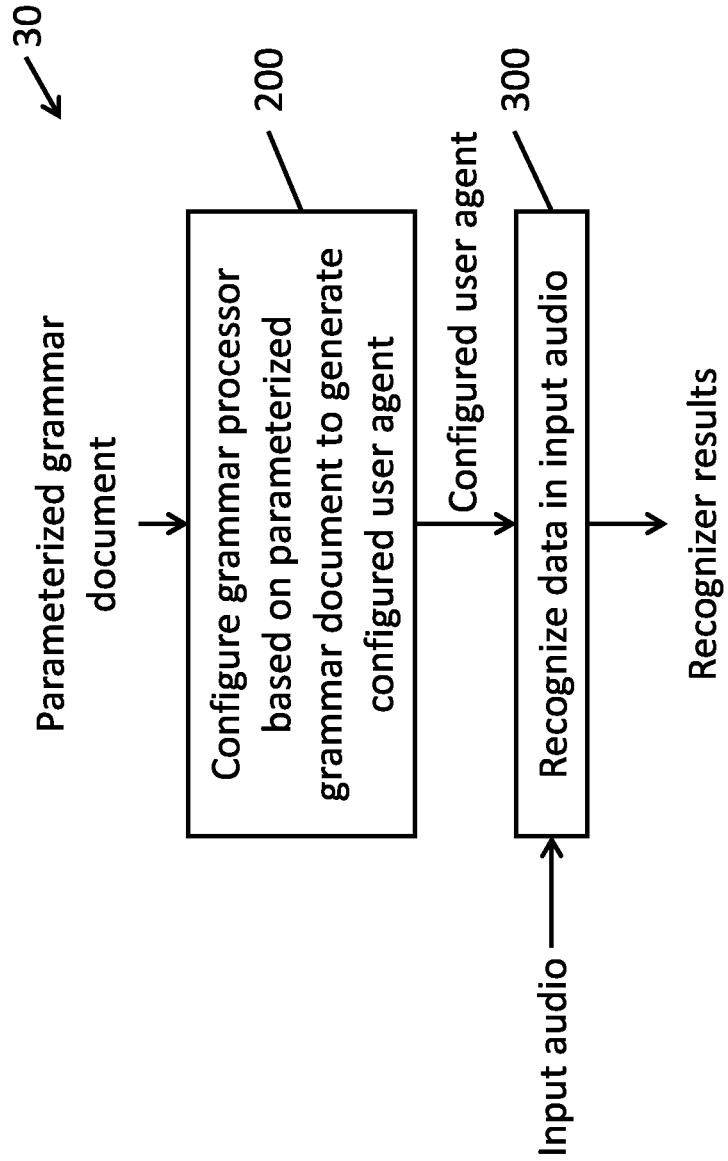
FIG. 3 is a flowchart depicting the configuration of a grammar processor and a user agent according to one embodiment of the present invention.

FIG. 3 is a flowchart depicting the configuration of a grammar processor and a user agent according to one embodiment of the present invention. As shown in FIG. 3, a parameterized grammar document (e.g., a grammar document using having a modified version of the SRGS syntax that includes parameterized rules) is supplied to configure, in operation 200, a grammar processor according to embodiments of the present invention. The result of the configuration of the grammar processor is a user agent that is configured to detect instances of audio data that match the grammars defined in the parameterized grammar document. In operation 300, the user agent recognizes these data in the input audio and generates recognizer results in accordance with those matching instances.

Below are examples of parameterized grammars according to embodiments of the present invention that are executed by the grammar processor as described above.

One example of an SRGS grammar (specified in Augmented Backus-Naur Form (ABNF)) for implementing the built-in Boolean DTMF grammar of the VoiceXML standard is provided below. (Embodiments of the present invention are not limited thereto and may also include grammars specified in other formats, such as extensible markup language or XML.) In particular, the below $root grammar is parameterized in that the system administrator can specify which keypress corresponds to a "yes" response and which keypress corresponds to a "no" response, in accordance with the VoiceXML standard. In addition, the $digit grammar is parameterized by a constant value, as shown below.

```
#ABNF 1.0 UTF-8;
mode dtmf;
root $root;
tag-format <semantics/1.0>;
meta "x-inin-builtin-name" is "boolean";
public $root =
{
    $digit:({@y}\1) {out=true} |
    $digit:({@n}\2) {out=false}
);
private $digit(0)=("0")
private $digit(1)=("1")
private $digit(2)=("2")
private $digit(3)=("3")
private $digit(4)=("4")
private $digit(5)=("5")
private $digit(6)=("6")
private $digit(7)=("7")
```

-continued

```
private $digit(8)=("8")
private $digit(9)=("9")
```

In the above grammar, which uses a modified grammar syntax in accordance with embodiments of the present invention, the "$digit" rule takes a single parameter (or argument). In addition, the definitions of the "$digit" rule are overloaded in the sense of the concept of "function overloading" feature available in some programming languages. In particular, calls to an overloaded function will run a particular implementation of that function appropriate to the context of the call, allowing one function call to execute in different ways, depending on how it is called. In particular, the arguments supplied to the rule are matched against the parameters of the various overloaded rules from narrowest to broadest (or most general), until one of the rules matches, and the matching rule is applied to the input, as described in more detail below.

Figure 4A:
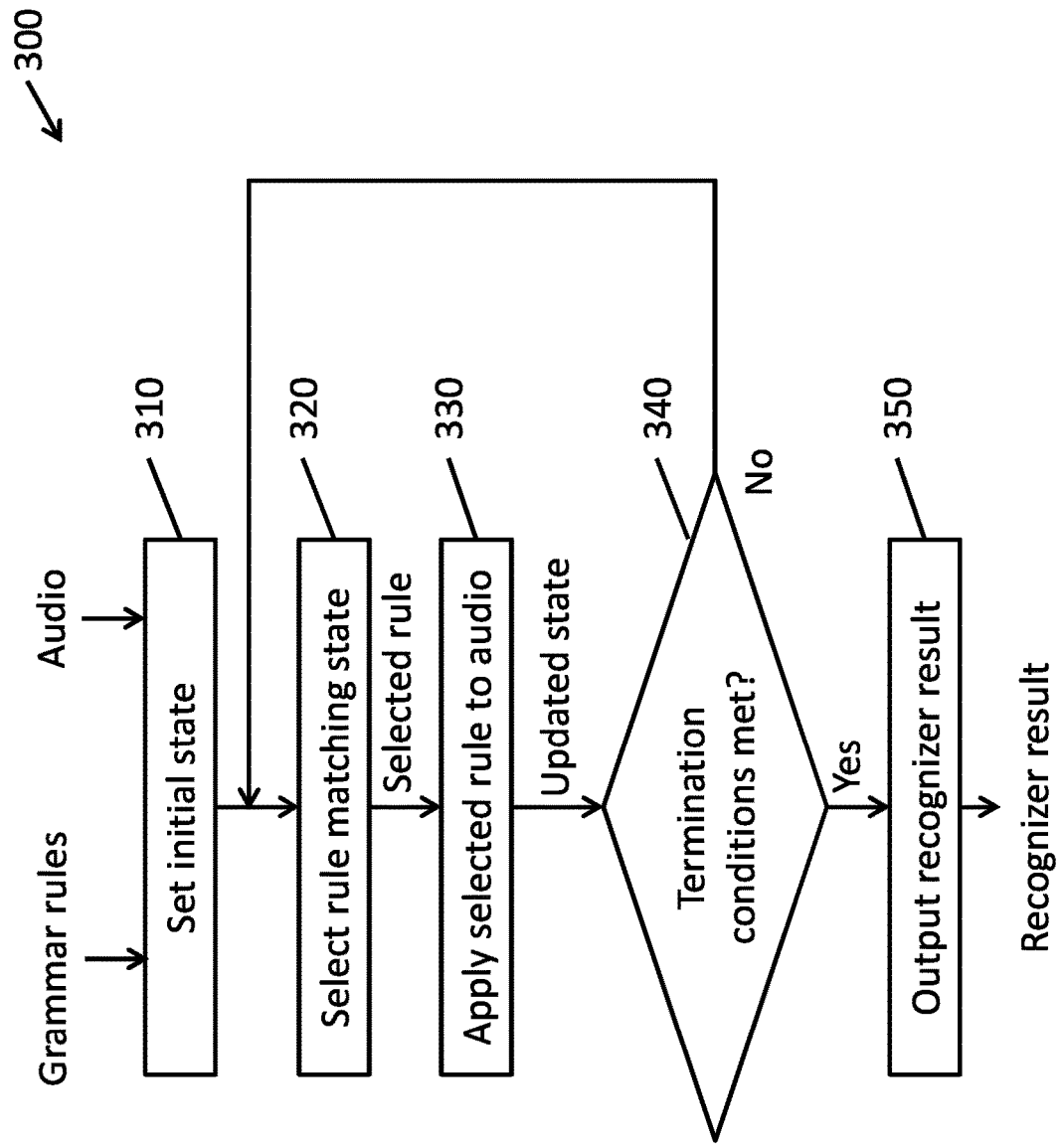
FIG. 4A is a flowchart depicting a method for recognizing data in input audio according to one embodiment of the present invention.

FIG. 4A is a flowchart depicting a method for recognizing data in input audio according to one embodiment of the present invention. Referring to FIG. 4, in operation 310, the parameterized grammar rules (e.g., a grammar document defining parameterized grammars in accordance with a modified SRGS syntax) is supplied along with audio input, and an initial state of the grammar processor is set (e.g., set based on parameters from the grammar rules). In operation 320, the grammar processor selects a rule from the grammar rules that matches the current state of the grammar processor. The current state may include, for example, a current position within the audio, the values of parameters supplied in the grammar rules, the current values of any variables within the grammar processor (for example, in the case of a recursive grammar processor, the state may include a call stack, where the current values of the variables may be stored in the call stack), and a current recognizer result. The selection of a rule matching the current state will be described in more detail below with respect to FIG. 4B.

In operation 330, the selected rule is applied to the current audio to attempt to match the current rule against the audio data (e.g., to detect a user input of a single spoken or DTMF digit in the audio). This results in an updated state, including advancing the current position of the audio (e.g., to a point after the recognized single digit), and updating the values of any variables and executing additional rules within the selected rule, and possibly updating the recognizer result (e.g., concatenating the recognized single digit onto the recognizer result).

In operation 340, the grammar processor determines whether termination conditions are met, such as through a failure, as indicated, for example, by a $VOID, or a successful recognition of user input matching a grammar. If the termination conditions are not met, then the grammar processor returns to operation 320 to select a rule matching the updated state and the process continues. If the termination conditions are met, then, in the case of a successful recognition, the grammar processor outputs the recognizer result in operation 350.

FIG. 4B is a flowchart depicting a method for identifying a matching overloaded rule through pattern matching according to one embodiment of the present invention. As shown in FIG. 4B, the overloaded rules are ordered by narrowness. E.g., rules containing only constants are the most narrow and appear first in the order, while rules containing only variables are broader and appear later in the order. Rules containing a mix of constants and variables are in between. In operation 322, a first rule (e.g., narrowest rule) of these ordered rules is set as the current rule.

In operation 324, the grammar processor determines whether the current rule matches the current state, e.g., the current values of the argument passed to the current rule as input. If so, then that rule is selected as the current rule to be applied. If not, then the next rule in the ordered list of rules is set as the current rule in operation 326, and the process continues with operation 324.

Returning to the above example grammar, the "$digit" rule has a single parameter that is a constant (e.g., one of the ten digits −0 through 9). As such, when the $digit rule is called with an argument, the grammar processor determines which of the overloaded digit rules matches the argument and executes the matching rule. In this case, because all of the $digit rules have a constant value (e.g., a single digit) in their parameters, they all have the same narrowness.

When referencing a digit in the $root rule, a parameter is passed to control which of the digit rule overloads should be considered. The colon (":") character in the $root rule specifies that the expression following the colon refers to a parameter. The backslash ("\") character in the expression specifies an alternate with short-circuit. For example, the expression {@foo}\{@bar}\0 means: "Use the value of the parameter 'foo' if it exists. If 'foo' does not exist, use the value of 'bar' if it exists. If 'bar' does not exist, use the value 0.

In the above example, the first argument expression in the first grammar (corresponding to the output "true") is "({@y}\1)" which means "if the grammar is called with a parameter named 'y', pass its value to the rule matcher. If no parameter named 'y' is provided (e.g., not provided in the parameterized grammar in the VoiceXML script), then the alternate fallback of "1" is passed to the rule matcher. As a specific example, if the VoiceXML script specifies a grammar of "boolean?y=4", then there is a parameter named 'y' and the corresponding overloaded digit rule "$digit(4)" is selected. Otherwise, the system short circuits to use the default, specified here as 1 (i.e., the rule "$digit(1)").

Continuing the above example, if no parameters are specified in the VoiceXML grammar, then the above rules would default to:

```
public $root =
{
    $digit:(1) {out=true} |
    $digit:(2) {out=false}
);
private $digit(1)=("1")
private $digit(2)=("2")
```

In some embodiments, more sophisticated constraints may be set by binding the parameters of the rules to variables. A rule containing variables in its argument is treated as being more general (or less narrow) than a rule that contains only constant values in its arguments, because a rule with variables can accept a wider range of inputs. For example, this may allow a digits grammar to be defined with the length, minlength, and maxlength parameters. For DTMF, the grammar may be defined as:

```
#ABNF 1.0 UTF-8;
mode dtmf;
root $digits;
```

```
tag-format <semantics/1.0>;
meta "x-inin-builtin-name" is "digits";
public $digits =
(
        $ndigits:({@length}\{@minlength}\1,
            {@length}\{@maxlength}\32)
            {out=rules.ndigits}
);
private $ndigits(Min, Max) =
(
        $digit {out=rules.digit}
        $ndigits:(Min-1 , Max-1) {out+=rules.ndigits}
);
private $ndigits(1, Max) =
(
        $digit {out=rules.digit}
        [$ndigits:(1, Max-1) {out+=rules.ndigits}]
);
private $ndigits(_, 0) =
(
        $VOID
);
private $digit =
(
        "0" {out="0"} | "1" {out="1"} | "2" {out="2"} | "3" {out="3"}
    |   "4" {out="4"} | "5" {out="5"} | "6" {out="6"} | "7" {out="7"}
    |   "8" {out="8"} | "9" {out="9"}
)
```

In the above example grammar according to some embodiments of the present invention, the "$ndigits" rule is defined with two arguments: a minimum number of digits and a maximum number of digits. As shown above, the $ndigits rule is referenced in the $digits rule, and the grammar of the $digits rule is configured based on the parameters supplied by the VoiceXML script. As shown above, when a "length" parameter is supplied, then the value associated with the "length" parameter is used as both the Min and the Max values in the $ndigits rule. Similarly, when a minlength parameter is supplied, that value is used as the Min value in the $ndigits rule, and when a maxlength parameter is supplied, that value is used as the Max value in the $ndigits rule. The rule, as shown above will default to minimum length of 1 when no "length" or "minlength" parameter is supplied, and will default to maximum length of 32 when no "length" or "maxlength" parameter is supplied, however embodiments of the present invention are not limited thereto and other reasonable defaults may be used in accordance with the context.

As shown above, there are three overloads of the "$ndigits" rule corresponding to different conditions. One of the overloads "$ndigits(Min, Max)" handles the general case, where the matcher "consumes" (or reads) and outputs one digit (the line "$digit {out=rules.digit}"), and then recursively calls the ndigits rule with Min and Max values reduced by 1, and concatenates the output of that recursive call to the current output (the line "$ndigits:(Min-1, Max-1) {out+=rules.ndigits}"). As such, this rule will consume digits as long as they are available in the input audio.

The two remaining overloads correspond to base-cases to ensure that the matching process will terminate. The "$ndigits(1, Max)" overload matches the case where Min has already reached 1, so that the recursive call merely decrements the Max value and not the Min value. In this case, a valid path exists (the grammar can match) but there might be more digits (up to the maximum). In addition, the recursive call in this overload is wrapped in square brackets, indicating that the recursive call is optional and that the matching path can terminate successfully if there are no more digits to consume. (This is sensible because the minimum number of digits condition is satisfied.)

In particular, the "$ndigits(_, 0)" overload matches the case where the Max length is 0, that is, when the maximum number of digits is reached. (The underscore character ('_') indicates that the argument is ignored.) When this condition holds, all subsequent paths through the input data are invalid (e.g., if there are more digits in the audio input), and paths may be rejected when this condition is reached. The rejection of these paths (indicating a failure to find a match between the input audio and the grammar) is indicated by the output of the $VOID.

According to embodiments of the present invention, the above described rules are evaluated by the grammar processor in order of "narrowness" of their constraints. In particular, the speech recognizer attempts to match the narrower rules before attempting to match the "broader" or more general rules. In particular, a rule that has constant value as a parameter is "narrower" than one that has a variable as an argument. As such, in the above example, the speech recognizer would first attempt to match the base case rule with only constants, "$ndigits(_, 0)" based on the current values of the arguments (e.g., whether the second argument was equal to 0) and, if this failed to match, then the speech recognizer would continue processing input with the next more general case of "$ndigits(1, Max)," based on whether the value of the first argument was equal to 1. If the pattern was not matched, then the speech recognizer would apply the least narrow or most general case of "$ndigits (Min, Max)".

In some embodiments, the above example is handled by allowing parameterization of the repeat counts, such as:

```
public $digits =
{
    {out=' ') ($digit {out+=rules.digit})<{@length} \
                                    {@minlength}\
                                    {1-{@length}\
                                    {@maxlength}\
                                    32>
```

However, the above parameterization of repeat counts would not support complex constraints, such as the "double" digits described above.

According to one embodiment of the present invention, a grammar may be specified to handle the case of "double" digits in a grammar for spoken voice audio input:

```
#ABNF 1.0 UTF-8;
mode voice;
root $digits;
tag-format <semantics/1.0>;
meta "x-inin-builtin-name" is "digits";
public $digits =
(
        $ndigits:({@length}\{@minlength}\1,
            {@length}\{@maxlength}\32)
            {out=rules.ndigits}
);
private $ndigits(Min, Max) =
(
        ($digit {out=rules.digit}
            $ndigits:(Min-1, Max-1) {out+=rules.ndigits}) |
        ($doubles {out=rules.doubles}
            $ndigits: (Min-2, Max-2) {out+=rules.ndigits})
);
private $ndigits(2, Max) =
(
        ($doubles {out=rules.doubles}
            [$ndigits:(1, Max-2) {out+=rules.ndigits}]) |
        ($digit {out=rules.digit}
            $ndigits:(1, Max-1) {out+=rules.ndigits})
);
```

-continued

```
private $ndigits(1, Max) =
(
    ($doubles {out=rules.doubles}
        [$ndigits:(1, Max-2) {out+=rules.ndigits}])
    ($digit {out=rules.digit}
        [$ndigits:(1, Max-1) {out+=rules.ndigits}])
);
private $ndigits(1, 1) =
(
    $digit {out=rules.digit)
)
private $ndigits(_, 0) =
(
    $VOID
);
private $digit =
(
    /0.1/ oh {out="0"}
    /1.0/ zero {out="0"}
    /1.0/ one {out="1"}
    /1.0/ two {out="2"} |
    /1.0/ three {out="3"} |
    /1.0/ four {out="4"} |
    /1.0/ five {out="5"} |
    /1.0/ six {out="6"} |
    /1.0/ seven {out="7"} |
    /1.0/ eight {out="8"} |
    /1.0/ nine {out="9"}
)
public $doubles =
(
    double $digit {out=rules.digit+rules.digit}
)
```

In the above grammar specification, the rules are arranged in order to handle the "double" digits while ensuring that the minlength and maxlength constraints are satisfied. For example, with the parameters "minlength= 3&maxlength=7", the utterance "two three double five" should satisfy the constraints. However, a rule that merely searched for three $digit instances (e.g., $digit<3>) before switching to a rule that allows up to four more digits would not match this utterance because the "double five" straddles the minlength.

As such, referring to the above rules, the general case of $ndigits(Min, Max) requires a single digit or a double digit followed by more digits and thus always consumes digits if there are any, but the rule cannot terminate on its own (because, if this rule matches, Min is greater than 1). This rule has lowest priority, as both arguments (Min and Max) are variables.

The $ndigits(2, Max) rule is a candidate when the minimum number of digits reaches two. However, at least two more digits are necessary for the rule to be satisfied. If there is a "double", then those two digits have been found and the recursive call is therefore optional (as indicated by the square brackets). However, if a double is not found, then the match proceeds with a single digit. Because only one more digit was consumed, one more digit is still needed to satisfy the minlength constraint, and therefore the recursive call along that path is not optional (no square brackets)

The $ndigits(1, max) rule matches if at least one more digit is expected and the maxlength has not been reached. If at least one more digit is expected, a single digit or a double digit followed by optionally more of the same may be present. Therefore, after consuming a digit, the path can terminate (no more digits are needed to satisfy the minlength constraint) and therefore the recursive calls in both the "doubles" path and the "digit" path are optional.

In the case of $ndigits(1, 1), only one more digit can be consumed before reaching the maxlength parameter. If this is the case, a "double" cannot be consumed at this point and therefore, as shown above, the only rule in this case is a single $digit rule without a recursive call.

Finally, the case of $ndigits(_, 0) handles the case when the maximum number of has already been reached and therefore the rule rejects the path. This causes the path to terminate if one of the optional sections of $ndigits(1, Max) or $ndigits(1, Max) rules is present, or it fails to match. It also fails to match if the grammar is invoked with a maxlength of zero or if the grammar is invoked with a minlength greater than maxlength.

In the embodiments of the present invention described above, matching rules were selected based on matching to constants. However, in other embodiments of the present invention, more elaborate constraints (apart from equality) are applied by extending the syntax of the rule to include a constraint expression.

For example, a rule may include the constraint:
private $ndigits(Min,Max)?[Min>0&&Min<=Max]= . . . .
This constraint on the values of Min and Max is expressed herein with the "?" character with a Boolean expression enclosed in square brackets, and expresses the constraint that the rule is only eligible if the Min and Max values are bound to values that satisfy the mathematical inequality conditions Min>0 and Min≤Max.

Similarly, the following three rules would be equivalent:

```
private $ndigits(1, 1) =
(
    $digit {out=rules.digit}
);
private $ndigits(1, Max)?[Max=1] =
(
    $digit {out=rules.digit}
);
private $ndigits(Min, Max)?[Min=1&&Max=1] =
(
    $digit {out=rules.digit}
);
```

As such, aspects of embodiments of the present invention are directed to a modified grammar processor that accepts parameterized grammars as input and that thereby allows the specification of richer and more complex custom grammars in accordance with business needs of users. These custom grammars are defined within a grammar document and the custom grammars are implemented without the use of additional code (e.g., SISR code), thereby allowing for the efficient execution of the custom grammars when matching grammars to audio input, without using an additional interpreter or engine (e.g., an ECMAScript or JavaScript engine).

While examples of embodiments of the present invention are presented above with respect to grammars that contain only digits, embodiments of the present invention are not limited thereto and may also be applied to parameterization of grammars corresponding to other types of speech input, including letters, words, phrases, and combinations thereof.

Computing Devices

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 5A, FIG. 5B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 5A:
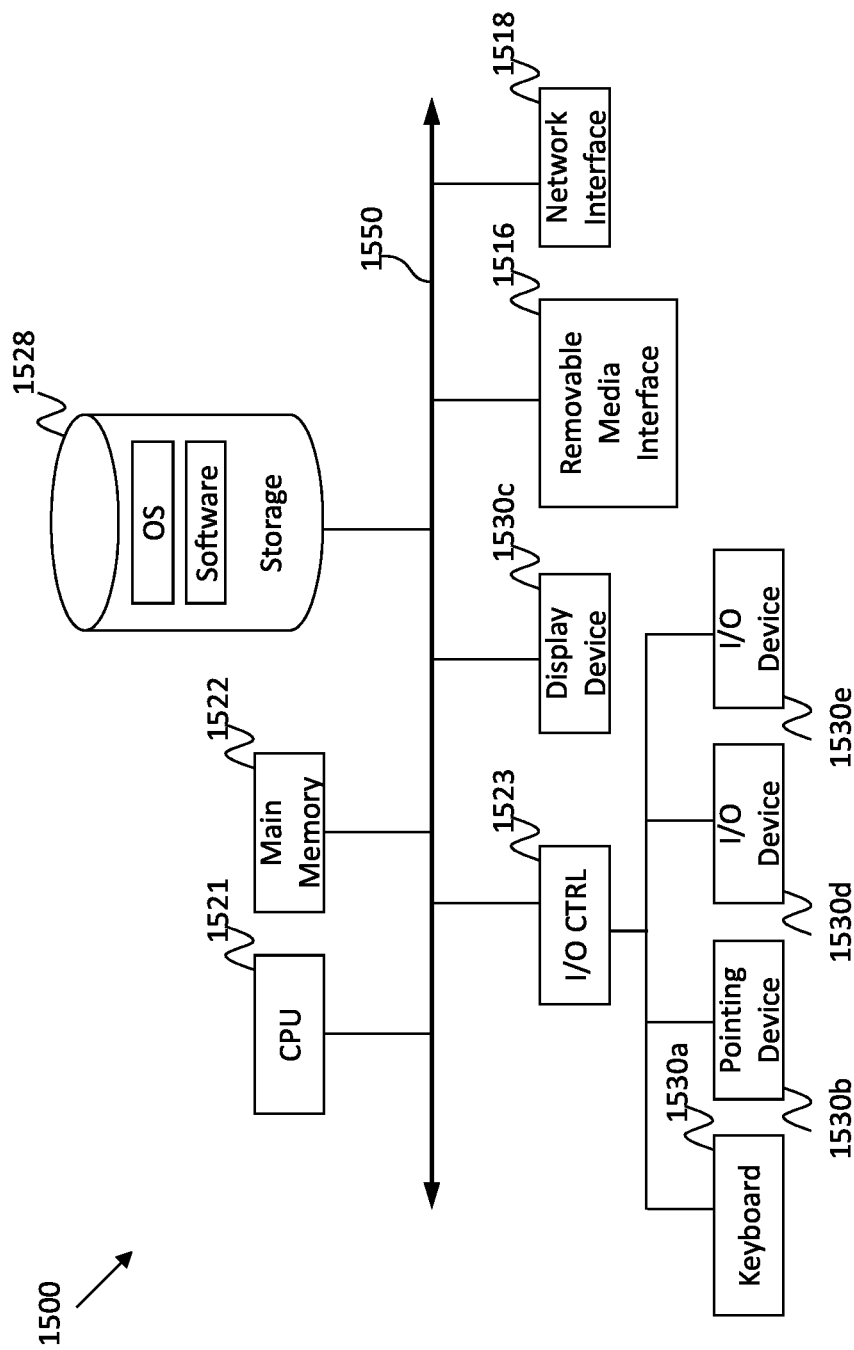
FIG. 5A is a block diagram of a computing device according to an embodiment of the present invention.
Figure 5B:
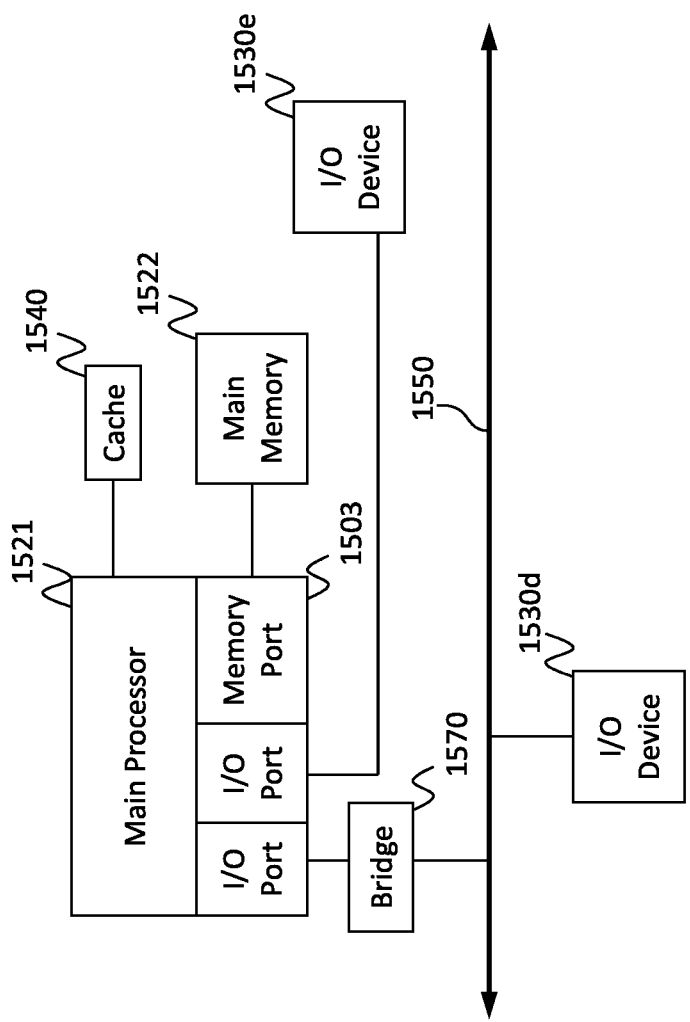
FIG. 5B is a block diagram of a computing device according to an embodiment of the present invention.

FIG. 5A-FIG. 5B depict block diagrams of a computing device 1500 as may be employed in exemplary embodiments of the present invention. Each computing device 1500 includes a central processing unit 1521 and a main memory unit 1522. As shown in FIG. 5A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 5B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 5A, the central processing unit 1521 communicates with the main memory 1522 via a system bus 1550. As shown in FIG. 5B, the central processing unit 1521 may also communicate directly with the main memory 1522 via a memory port 1503.

FIG. 5B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 5A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 5B depicts an embodiment of a computer 1500 in which the central processing unit 1521 communicates directly with I/O device 1530e. FIG. 5B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 5A, may control the I/O devices. The I/O controller may control one or more I/O devices such as a keyboard 1530a and a pointing device 1530b, e.g., a mouse or optical pen.

Referring again to FIG. 5A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530*c*, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect, or otherwise use the display devices 1530*c*. In one embodiment, a video adapter may include multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 5A-FIG. 5B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

Figure 5D:
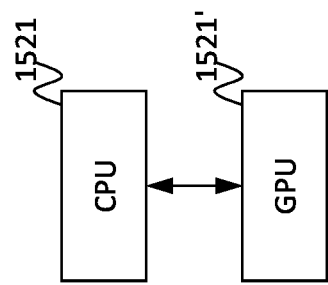
FIG. 5D is a block diagram of a computing device according to an embodiment of the present invention.
Figure 5C:
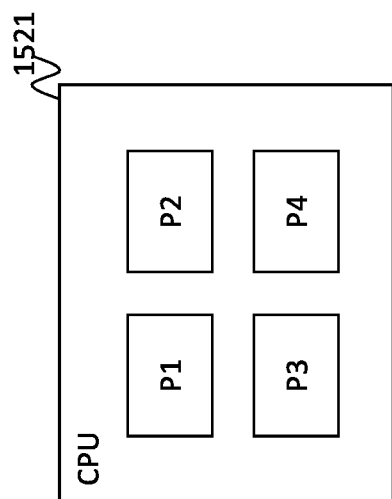
FIG. 5C is a block diagram of a computing device according to an embodiment of the present invention.

As shown in FIG. 5C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 5D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 5E:
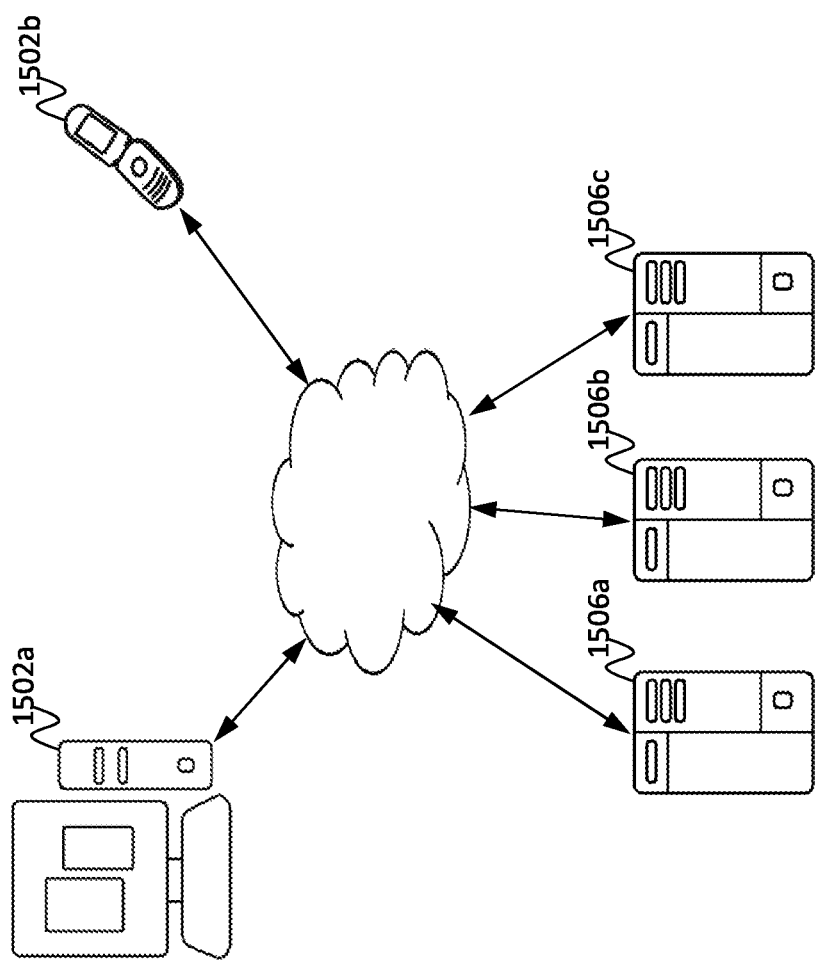
FIG. 5E is a block diagram of a network environment including several computing devices according to an embodiment of the present invention.

A computing device may be one of a plurality of machines connected by a network, or it may include a plurality of machines so connected. FIG. 5E shows an exemplary network environment. The network environment includes one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 5E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 5E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for automatically recognizing speech matching grammars in audio, comprising:
   loading, by a processor, a grammar specification defining at least one parameterizable grammar, the at least one parameterizable grammar corresponding to a type of speech input and the at least one parameterizable grammar comprising a plurality of rules defining constraints on speech corresponding to the type of speech input;
   setting, by the processor, an initial state of a grammar processor as a current state, the current state comprising parameters supplied to the rules;
   selecting, by the processor, a rule of the plurality of rules matching the parameters of the current state of the grammar processor;
   applying, by the processor, the selected rule to the audio and updating the current state to compute an updated state comprising a plurality of updated parameters;
   determining, by the processor, whether termination conditions have been met;
   in response to determining the termination conditions are not met, selecting, by the processor, from the plurality of rules in accordance with the updated parameters of the updated state; and
   in response to determining the termination conditions are met, outputting, by the processor, a recognizer result of the updated state.

2. The method of claim 1, wherein each of the rules comprises a corresponding matching condition, the matching conditions having different levels of narrowness, the rules being ordered in accordance with corresponding levels of narrowness.

3. The method of claim 2, wherein the selecting the rule from the plurality of rules comprises:
   selecting a narrowest rule of the rules as a current rule; and
   iteratively:
      determining if the matching condition of the current rule is met;
      in response to determining that the matching condition is met, applying the current rule; and
      in response to determining that matching condition is not met, setting a next rule of the rules, in order of narrowness, as the current rule.

4. The method of claim 3, wherein the matching condition comprises a Boolean expression.

5. The method of claim 4, wherein the Boolean expression comprises an inequality condition.

6. The method of claim 1, wherein the grammar is a dual-tone multi-frequency grammar.

7. The method of claim 1, wherein the grammar is a voice grammar.

8. A system comprising:
   a processor; and
   memory having instructions stored thereon that, when executed by the processor, cause the processor to automatically recognize speech matching grammars in audio by:
      loading a grammar specification defining at least one parameterizable grammar, the at least one parameterizable grammar corresponding to a type of speech input and the at least one parameterizable grammar comprising a plurality of rules defining constraints on speech corresponding to the type of speech input;
      setting an initial state of a grammar processor as a current state, the current state comprising parameters supplied to the rules;
      selecting a rule of the plurality of rules matching the parameters of the current state of the grammar processor;
      applying the selected rule to the audio and updating the current state to compute an updated state comprising a plurality of updated parameters;
      determining whether termination conditions have been met;
      in response to determining the termination conditions are not met, selecting from the plurality of rules in accordance with the updated parameters of the updated state; and
      in response to determining the termination conditions are met, outputting a recognizer result of the updated state.

9. The system of claim 8, wherein each of the rules comprises a corresponding matching condition, the matching conditions having different levels of narrowness, the rules being ordered in accordance with corresponding levels of narrowness.

10. The system of claim 9, wherein the memory further stores instructions that, when executed by the processor, cause the processor to select a rule from the plurality of rules by:
    selecting a narrowest rule of the rules as a current rule; and
    iteratively:
       determining if the matching condition of the current rule is met;
       in response to determining that the matching condition is met, applying the current rule; and
       in response to determining that matching condition is not met, setting a next rule of the rules, in order of narrowness, as the current rule.

11. The system of claim 10, wherein the matching condition comprises a Boolean expression.

12. The system of claim 11, wherein the Boolean expression comprises an inequality condition.

13. The system of claim 8, wherein the grammar is a dual-tone multi-frequency grammar.

14. The system of claim 8, wherein the grammar is a voice grammar.

15. A system for automatically recognizing speech matching grammars in audio, comprising:
- means for loading a grammar specification defining at least one parameterizable grammar, the at least one parameterizable grammar corresponding to a type of speech input and the at least one parameterizable grammar comprising a plurality of rules defining constraints on speech corresponding to the type of speech input;
- means for setting an initial state of a grammar processor as a current state, the current state comprising parameters supplied to the rules;
- means for selecting a rule of the plurality of rules matching the parameters of the current state of the grammar processor;
- means for applying the selected rule to the audio and updating the current state to compute an updated state comprising a plurality of updated parameters;
- means for determining whether termination conditions have been met;
- means for selecting from the plurality of rules in accordance with the updated parameters of the updated state, in response to determining the termination conditions are not met; and
- means for outputting a recognizer result of the updated state in response to determining the termination conditions are met.

16. The system of claim 15, wherein each of the rules comprises a corresponding matching condition, the matching conditions having different levels of narrowness, the rules being ordered in accordance with corresponding levels of narrowness.

17. The system of claim 16, wherein the means for selecting a rule from the plurality of rules comprises:
- means for selecting a narrowest rule of the rules as a current rule; and
- means for, iteratively:
  - determining if the matching condition of the current rule is met;
  - in response to determining that the matching condition is met, applying the current rule; and
  - in response to determining that matching condition is not met, setting a next rule of the rules, in order of narrowness, as the current rule.

18. The system of claim 17, wherein the matching condition comprises a Boolean expression.

19. The system of claim 18 wherein the Boolean expression comprises an inequality condition.

* * * * *